United States Patent [19]
Kohno et al.

[11] Patent Number: 6,048,571
[45] Date of Patent: Apr. 11, 2000

[54] APPARATUS FOR ENCAPSULATING SEED BY GEL

[75] Inventors: Yasushi Kohno; Kazushi Nakatsukasa, both of Hime, Japan

[73] Assignee: Agritecno Yazaki Co., Ltd., Hyogo-ken, Japan

[21] Appl. No.: 08/978,296

[22] Filed: Nov. 25, 1997

[30] Foreign Application Priority Data

Jul. 31, 1997 [JP] Japan .................................. 9-206712

[51] Int. Cl.[7] .................................................. A01G 13/00
[52] U.S. Cl. .............................. 427/4; 427/212; 118/13; 118/26; 118/30; 118/407; 118/423
[58] Field of Search ................................. 118/13, 26, 30, 118/407, 423; 427/4, 212; 47/57.6

[56] References Cited

U.S. PATENT DOCUMENTS

| | | | |
|---|---|---|---|
| 4,806,357 | 2/1989 | Garrett et al. | 427/4 |
| 5,107,787 | 4/1992 | Kouno | 118/26 |
| 5,254,358 | 10/1993 | Kouno et al. | 427/4 |
| 5,567,238 | 10/1996 | Long, Jr. et al. | 118/13 |

FOREIGN PATENT DOCUMENTS

| | | |
|---|---|---|
| 8-149906 | 6/1996 | Japan . |
| 9-149710 | 6/1997 | Japan . |

*Primary Examiner*—Laura Edwards
*Attorney, Agent, or Firm*—Knobbe, Martens, Olson & Bear, LLP

[57] ABSTRACT

An apparatus for encapsulating seed by gel of the present invention, wherein seed are drawn from a hopper of a seed supply portion into a stocker, are absorbed by an absorption head from a stocker, and are conveyed by move of the absorption head. The stocker comprising a vibrator and a vibratory plate, wherein one side of the vibratory plate forms a recess for storing the seed thereon, and the other side of the vibratory plate is connected with the vibrator, so that the seed on the vibratory plate are suspended by vibration of the vibrator. Thrust pins exsertably inserted into end nozzles of the absorption head and connected with an actuator, so that the thrust pins project at the period of casting the seed from the end nozzles.

18 Claims, 13 Drawing Sheets

APPARATUS FOR ENCAPSULATING SEED BY GEL

BACKGROUND OF THE INVENTION

1. Field of the Invention

The present invention relates to an apparatus for encapsulating seed by gel, which is particularly applied to production of minute seed encapsulated by gel in a plurality of lines continuously.

2. Related Art

The Japanese Laid Open Gazette Hei. 8-149906 describes a well-known conventional technique with respect to encapsulating seed by gel by use of gelling mixed with nutrition, medicine and the like, wherein seed are inserted one after another into a single nozzle so as to be encapsulated by gel. Encapsulated seed in gel produced by use of the technique can be supplied enough for the generality of farmers, however, cannot overtake the desired sum for a nursery company, an agricultural cooperative association, an extensive farmer and the like. Thus, such a well-known technique for continuous production of encapsulated seed in gel that seed are inserted into a plurality of nozzles simultaneously as described in the Japanese Laid Open Gazette Hei. 9-149710, for example, is used conventionally.

However, the conventional gel encapsulating apparatus of the above prior arts aim at processing seed like paddy rice having diameters between about 7 and 12 mm and cannot process the smaller seed than those. Because, there occasionally happens that some of minute seed are suspended in a seed supplying hopper, some enter an absorbing nozzle as a carriage of seed, which is so constructed as to absorb a seed against the mouth thereof, thereby clogging the absorbing nozzle, some stick to the inner surface of a processing nozzle for encapsulating seed by gel, and some take their positions on the outside of gel.

An object of the present invention is to provide an apparatus which can encapsulate seed by gel steadily, even if the seed are such minute seed as to have diameters smaller than 7 mm, so as to enable continuous production.

SUMMARY OF THE INVENTION

The summary of the present invention is as the follows:

In an apparatus for encapsulating seed by gel, by use of which seed are drawn out from a hopper of a seed supply portion into a stocker, are absorbed by an absorption head and are carried by move of the absorption head, the stocker comprises a vibratory plate and a vibrator, the vibratory plate forms at one side thereof a recess and communicates at the other side thereof with the vibrator, and seed are stored on the recess, so as to be suspended by vibration of the vibrator.

Also, in an apparatus for encapsulating seed by gel, by use of which seed are absorbed by an absorption head and are fed into discharge nozzles for discharging gelling, so as to encapsulate the seed with the gelling, thrust pins are exsertably inserted respectively into end nozzles of the absorption head and are connected with an actuator, so that the thrust pins project outwardly at the period of casting the seed into the discharge nozzles.

Also, in the above construction, when the seed are going to be cast, the end nozzles of the absorption head and the discharge nozzles for discharging gelling are disposed so as to face each other, and after the seed fall on the gelling, the thrust pins project outwardly so as to thrust the seed into the gelling in the discharge nozzles.

Also, in an apparatus for encapsulating seed by gel, by use of which seed are absorbed by a plurality of end nozzles of an absorption head and are fed into a plurality of discharge nozzles for discharging gelling, so as to encapsulate the seed with the gelling, the discharge nozzles are provided respectively on rotary nozzles, which are rotatable around the axes thereof and are disposed in parallel with each other, pinion portions are formed respectively at one sides of the rotary nozzles and engage with a rack in connection with an actuator, so that each discharge nozzle can be turned up and down by operation of the actuator.

Also, in an apparatus for encapsulating seed by gel, by use of which seed are absorbed by a plurality of end nozzles of an absorption head and are fed into a plurality of discharge nozzles for discharging gelling, so as to encapsulate the seed with the gelling, gel passages of the discharge nozzles communicate respectively with plungers contained in a plunger case, and the plungers are connected with a connection plate in connection with an actuator, so that the gellings are pushed out from the discharge nozzles simultaneously by operation of the actuator.

DETAILED DESCRIPTION OF THE PREFERRED EMBODIMENTS

Figure 1:
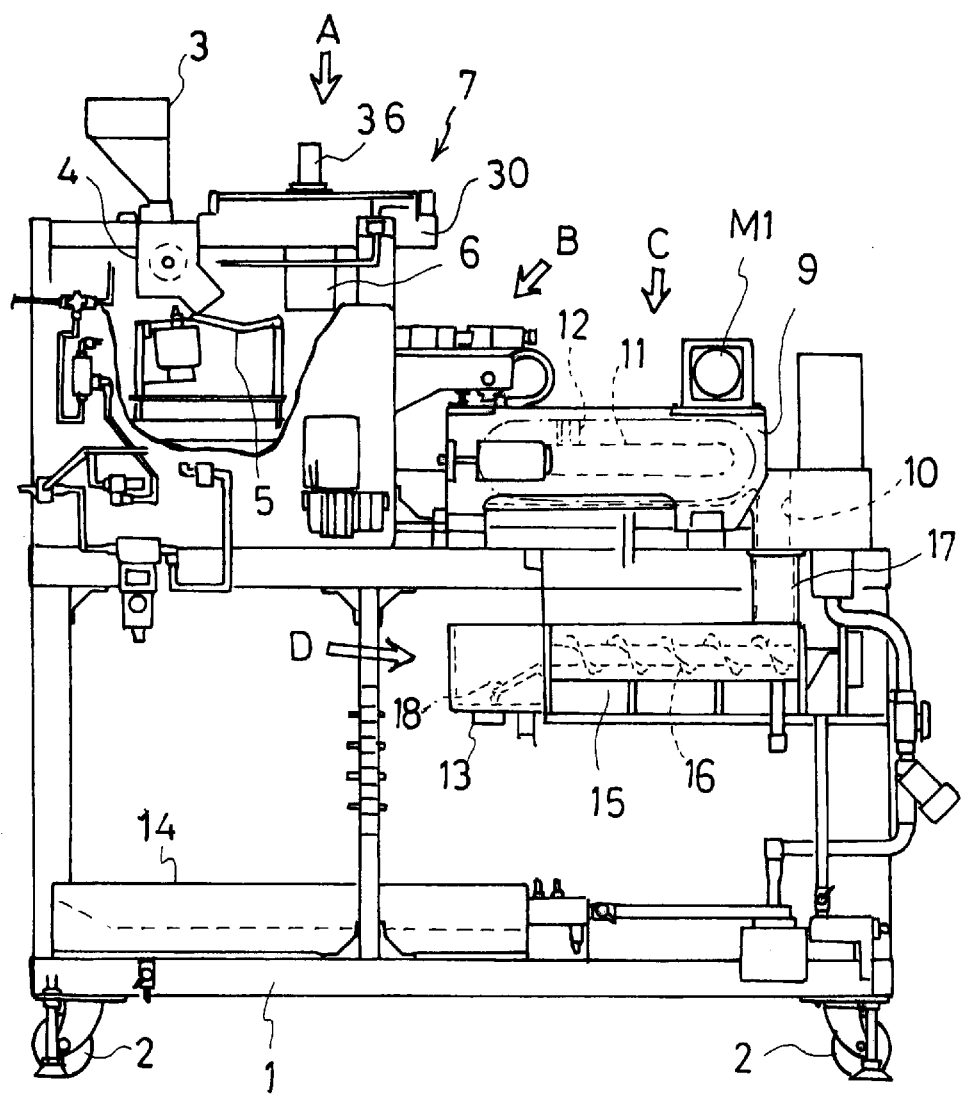
FIG. 1 is a front view of a gel encapsulating apparatus of the present invention.
Figure 2:
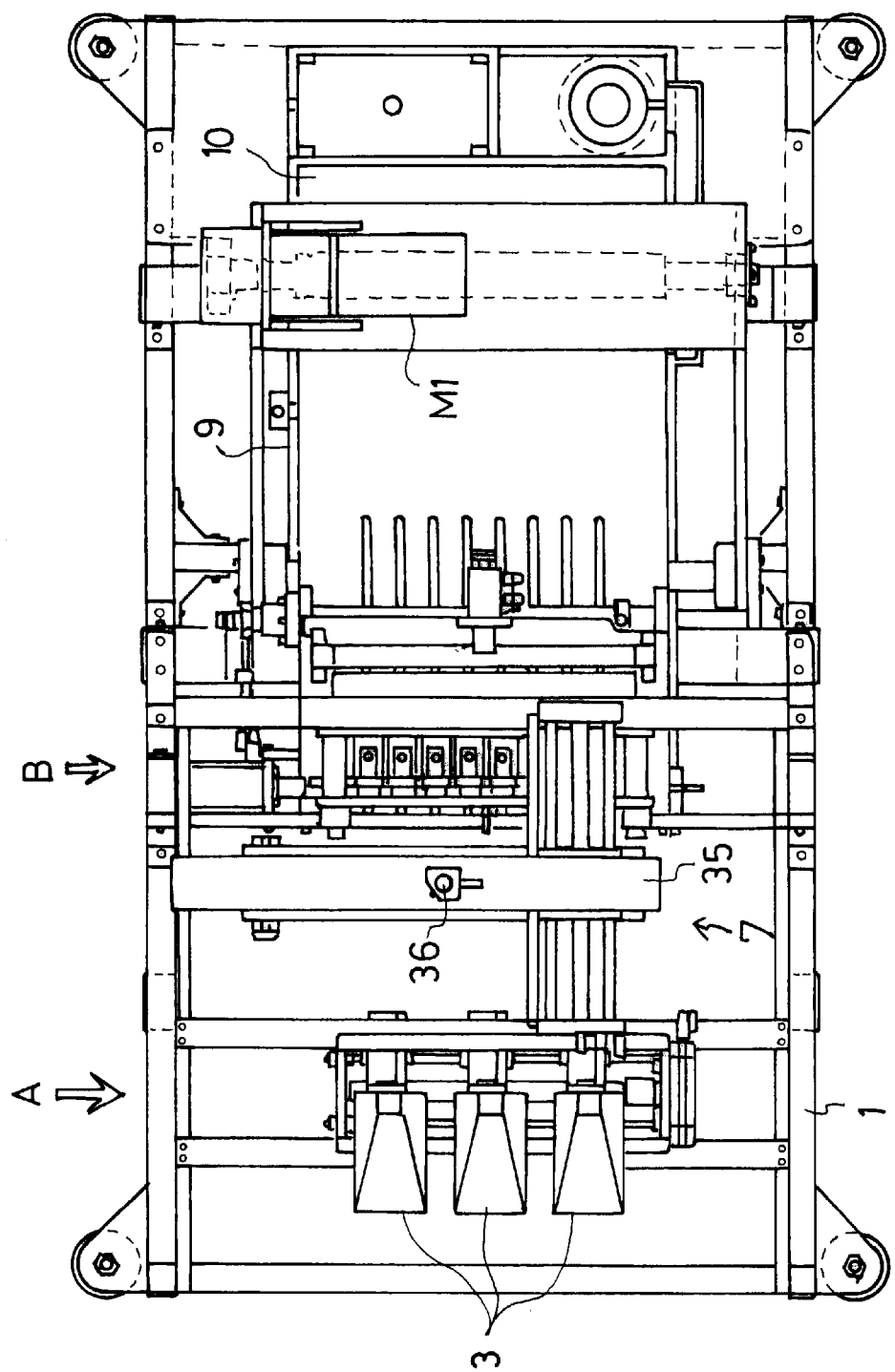
FIG. 2 is a plan view of the same.
Figure 3:
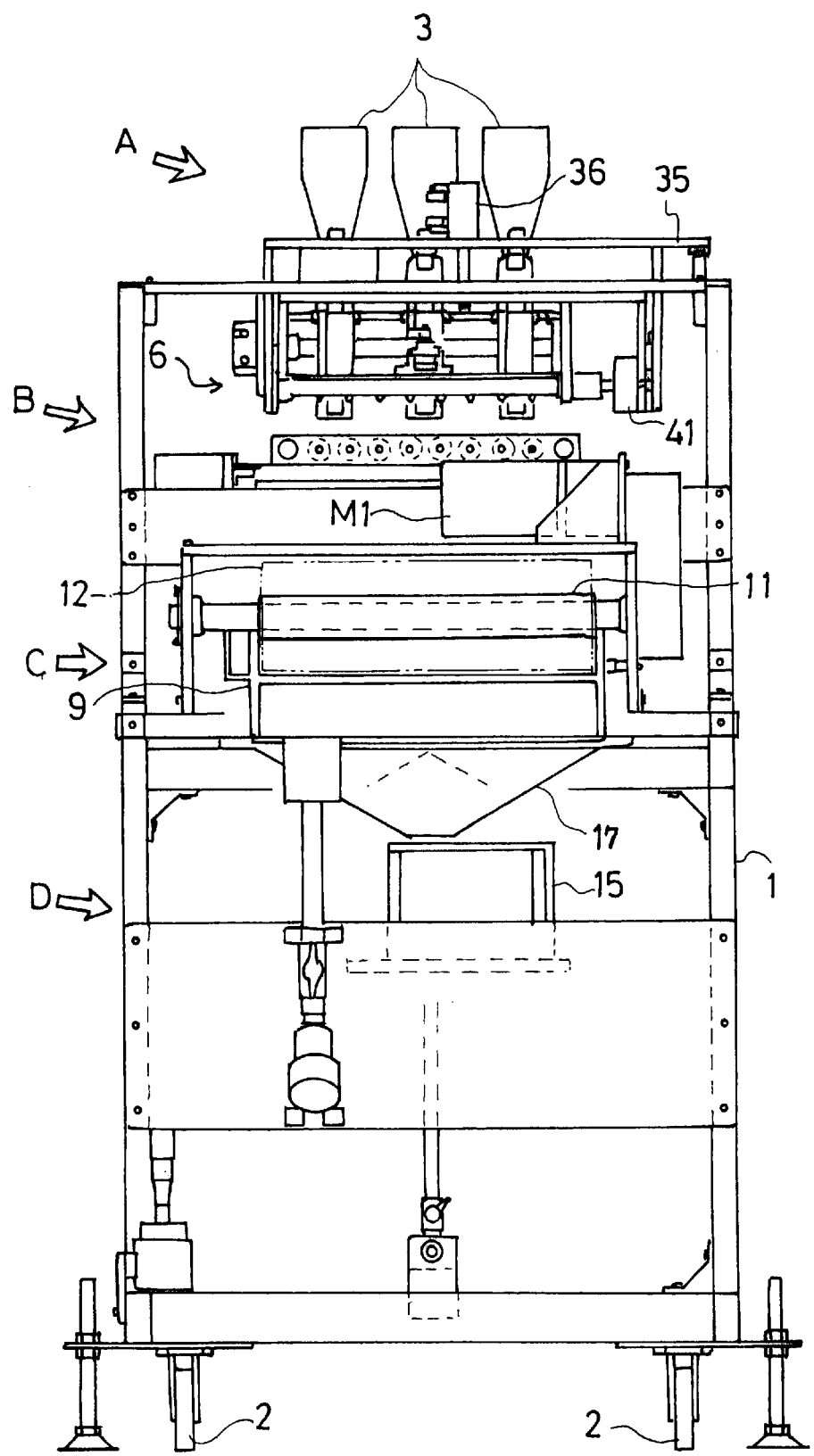
FIG. 3 is a side view of the same.

The whole construction of a gel encapsulating apparatus of the present invention will be explained in accordance with FIGS. 1, 2 and 3. The gel encapsulating apparatus comprises a seed supply portion A, a processing portion B, a hardening portion C and a washing portion D, which are supported by a frame 1. Frame 1 is provided at the lower portion thereof with casters 2, so as to ease the carriage thereof. Seed supply portion A to be discussed below comprises hoppers 3, drawing devices 4, a stocker 5, an absorption head 6 for absorbing seed S, and a carrying device 7 for carriage of absorption head 6. Processing portion B to be discussed below, which is disposed above the center of frame 1, receives seed S from seed supply portion A, encapsulates seed S by gelling so as to form into a settled size, and drops them.

Hardening portion C comprises a hardening tank 9 filled with hardener, which is spread in the right below processing portion B, and forms a falling hole 10 on the right end thereof opposite to processing portion B. A conveyor belt 11 is disposed above hardener 9. Paddles 12 project perpendicularly to the direction of conveyance of conveyor belt 11 from the external surface of conveyor belt 11 at regular intervals. Conveyor belt 11 is driven by a motor M1.

Thus, seed S encapsulated with unhardened gelling are dropped from processing portion B into hardening tank 9, so as to contact with the hardener, are conveyed in hardening tank 9 by paddles 12 of rotated conveyor belt 11, and fall through a falling hole 10 to washing portion D. The gelling encapsulating seed S are hardened since the falling thereof into hardening tank 9 till the falling thereof into washing portion D. The hardening period can be adjusted by adjustment of the speed of conveyance by controlling the rotational frequency of motor M1, so that the degree of hardness of the gelling can be adjusted.

Washing portion D is disposed between the lower portion of falling hole 10 in frame 1 and the center thereof. A discharging hole 13 is formed at the portion of washing portion D disposed at center of frame 1. A product container 14 is disposed below discharging hole 13.

Washing portion D comprises a washing water tank 15 and a screw 16. Screw 16 is disposed laterally in washing water tank 15 between falling hole 10 and discharging hole 13 and is driven by a motor (not shown). A funneled guide member 17 is disposed between falling hole 10 and the upstream end of washing water tank 15. A strainer 18 is disposed at the upstream side of discharging hole 13.

In such a construction, washing water tank 15 is filled with washing water, and seed S encapsulated by gelling hardened to a predetermined degree of hardness are soaked in water from failing hole 10 through guide member 17. Seed S encapsulated by gel are carried to discharging hole 13 by rotated screw 16. During the period of the carriage thereof, the hardner sticking to the external surfaces of the gelling encapsulating seed S are washed out, so as to stop hardening of the gelling. Seed S encapsulated by gel are removed therefrom excessive water through strainer 18 and are cast through discharging hole 13 into product container 14, so as to be contained.

Figure 4:
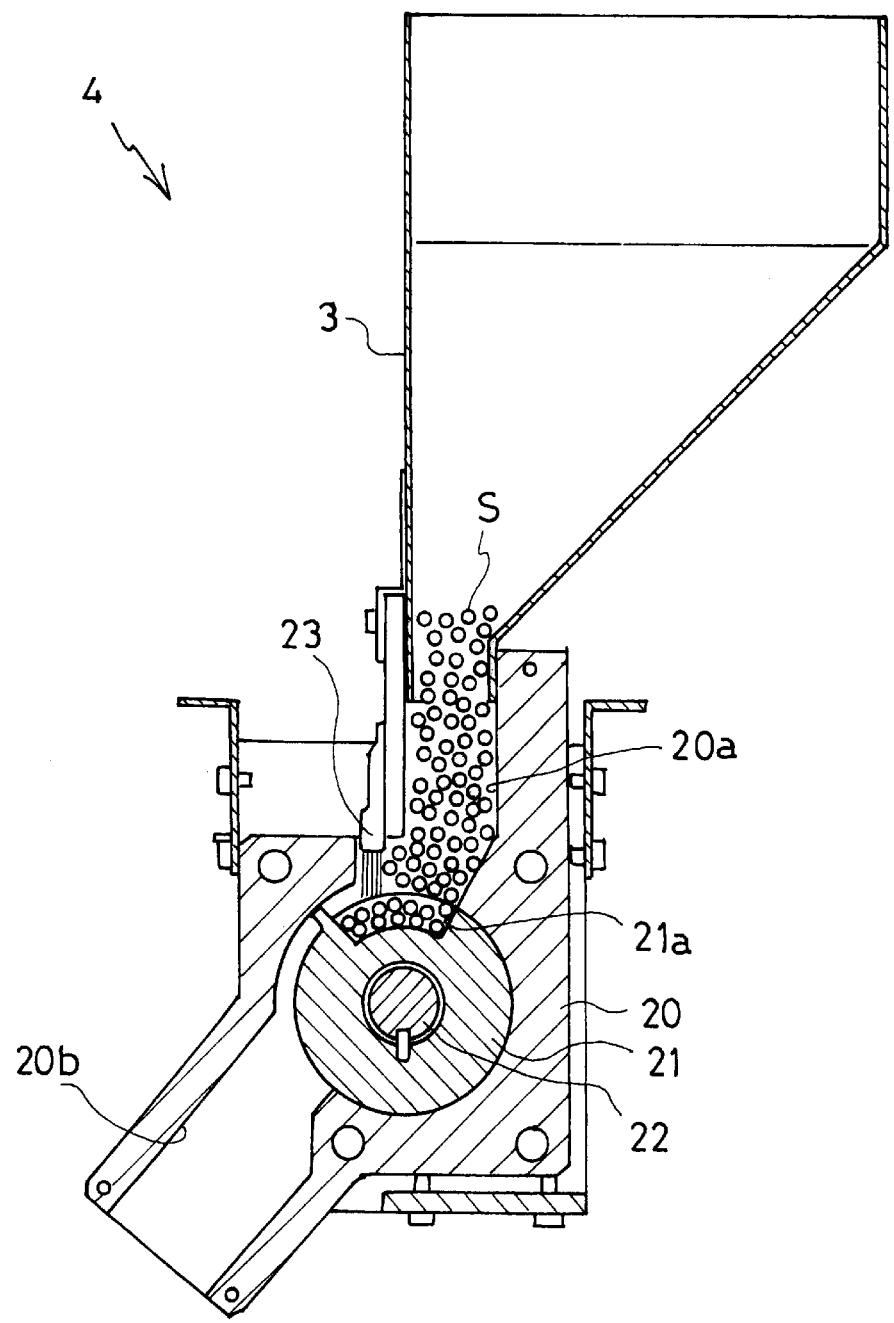
FIG. 4 is a rear sectional view of a hopper and a drawing device.

Next, explanation will be given on seed supply portion A as the principal part of the present invention. A plurality of hoppers (three hoppers in this embodiment) 3 are disposed in a row. Drawing devices 4 are disposed respectively under hoppers 3. One of drawing devices 4 will be described according to FIG. 4. Drawing device 4 is so constructed that a drawing roll 21 is contained in a drawing case 20, a driving shaft 22 is inserted through the axis portion of drawing roll 21 and is prevented from the relative rotation thereof by a key or the like, thereby drawing roll 21 is rotated by the rotation of driving shaft 22. An actuator like a motor, a rotary cylinder or so (not shown) is disposed at one end of driving shaft 22, so as to rotate driving shaft 22. The actuator is controlled by a control circuit. The circumference of drawing roll 21 partly forms a recess 21a, so as to put a plurality of seed S thereinto.

Also, drawing case 20 forms at the upper portion thereof a feeding hole 20a in communication with hopper 3 and forms at the lower portion thereof casting hole 20b being disposed above stocker 5. A brush 23 is disposed at the lower portion of feeding hole 20a so as to slidably contact with the circumferential surface of drawing roll 21.

In such a construction, three drawing rolls 21 are driven simultaneously by rotated driving shaft 22. A plurality of seed S put in each recess 21a are moved downwardly. During the downward movement thereof, excessive seed S overflowed the circumferences of drawing rolls 21 are removed by brushes 23, so that seed S of a fixed quantity are moved downwardly so as to be cast through casting halls 20b into a stocker 5. Drawing rolls 21 make one round and are stopped.

Figure 5:
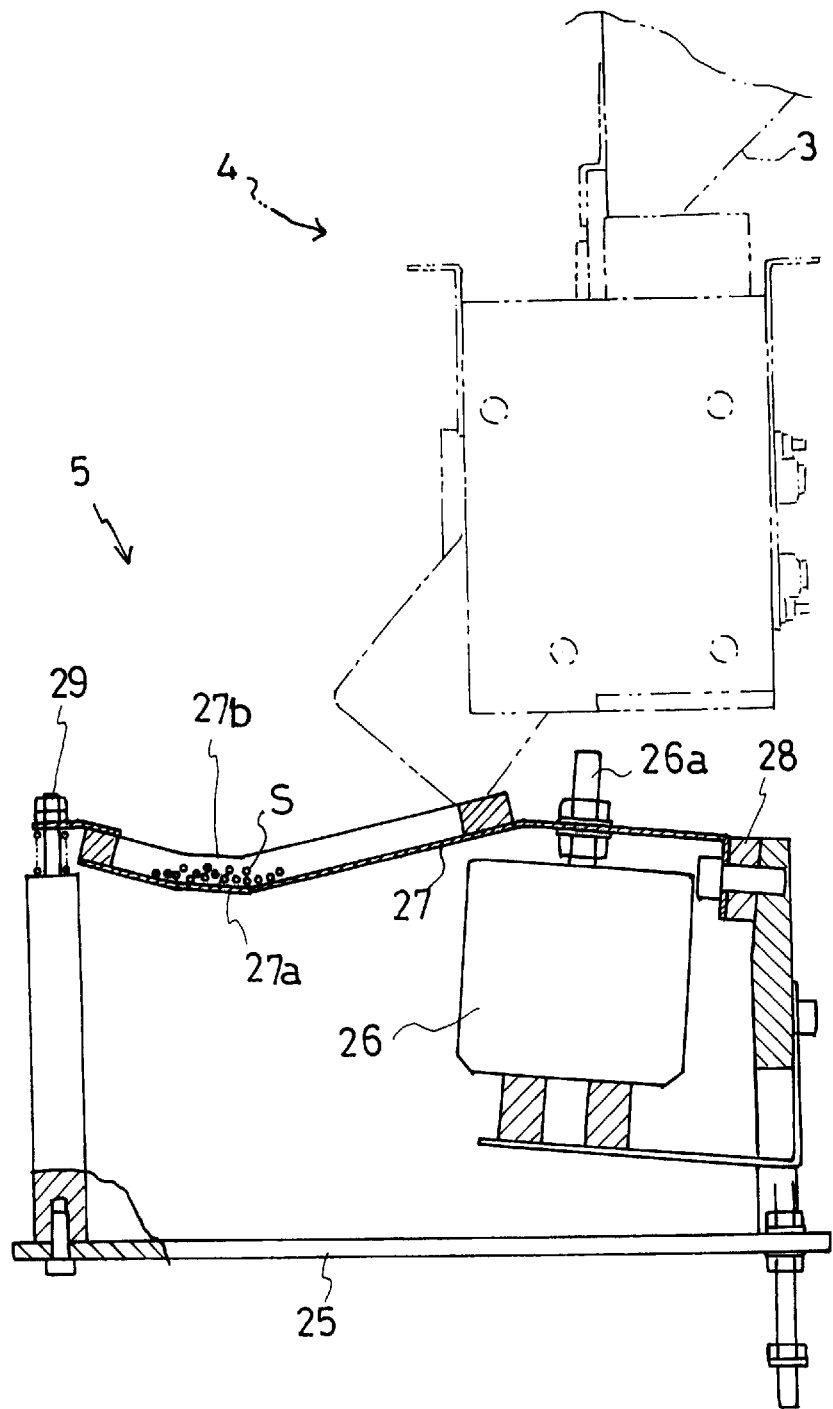
FIG. 5 is a rear sectional view of a stocker.
Figure 6:
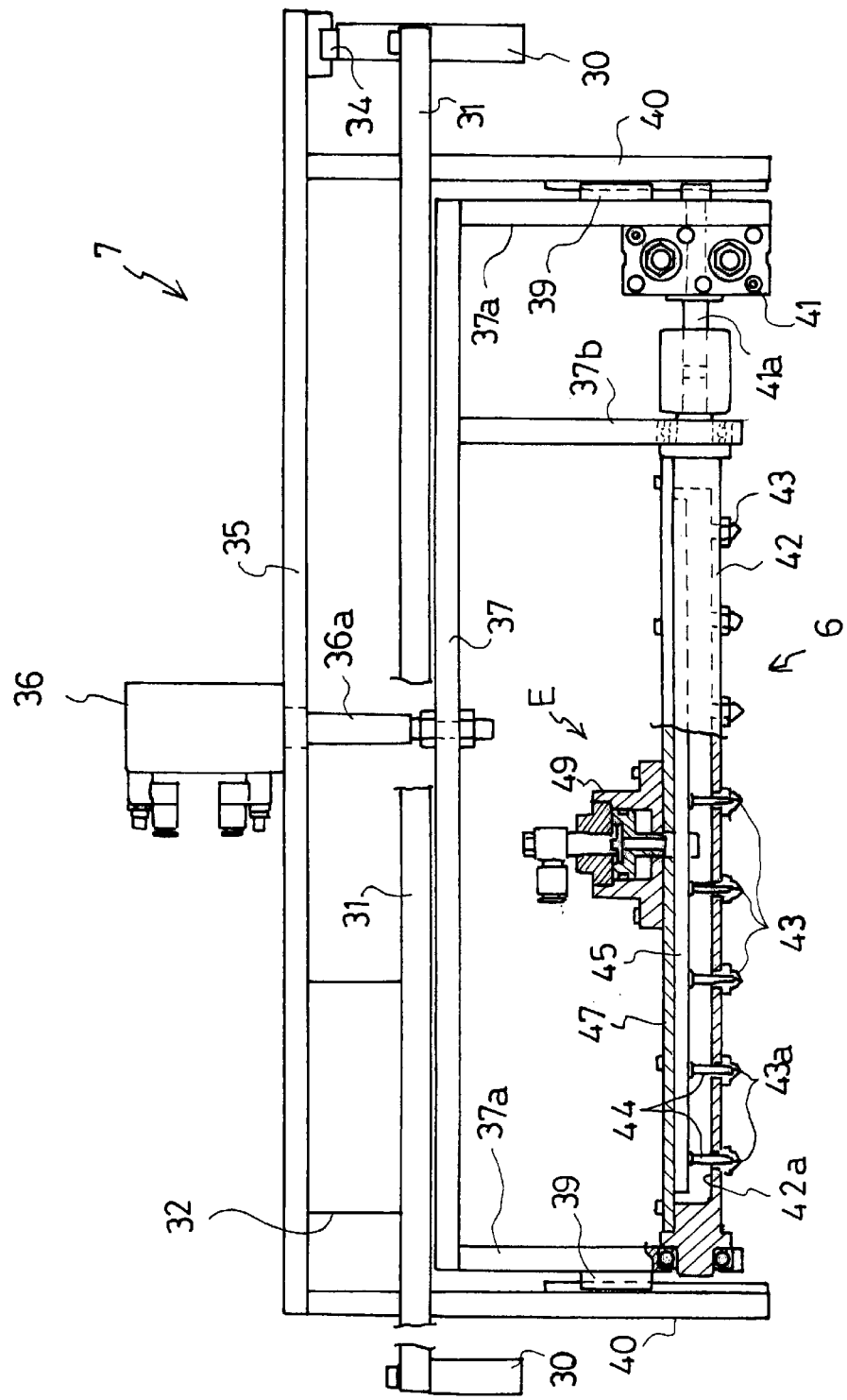
FIG. 6 is a partly sectional side view of an absorption head and a conveying device.

Stocker 5 stocks therein seed S of a fixed quantity, so that absorption head 6 can absorb seed S one by one easily. As shown in FIG. 5, stocker 5 is so constructed that a vibrator 26 and a vibratory plate 27 are disposed on frame 25, vibrator 26 is fixed onto one side (right side in FIG. 5) of frame 25 and a driving shaft 26a of vibrator 26 is fixed onto one side of vibratory plate 27. Vibratory plate 27 is V-like shaped in a front view and forms at the left side thereof (in FIG. 5) a recess 27a. One end of vibratory plate 27 is attached to frame 25 through a vibration proof member 28. The other end (the left end in FIG. 5) thereof freely engages with a bolt 29 and is biased upwardly by a spring, so that vibratory plate 27 can vibrate. Side plates 27b are formed at front and rear of recess 27a, so as to prevent seed S from falling.

In such a construction, seed S drawn by drawing device 4 fall on vibratory plate 27 and are collected on recess 27a. Vibrator 26 is driven so as to vibrate vibratory plate 27, so that seed S are properly scatteringly suspended on recess 27a without lumping and are absorbed respectively by nozzles of absorption head 6 to be discussed below.

Figure 7:
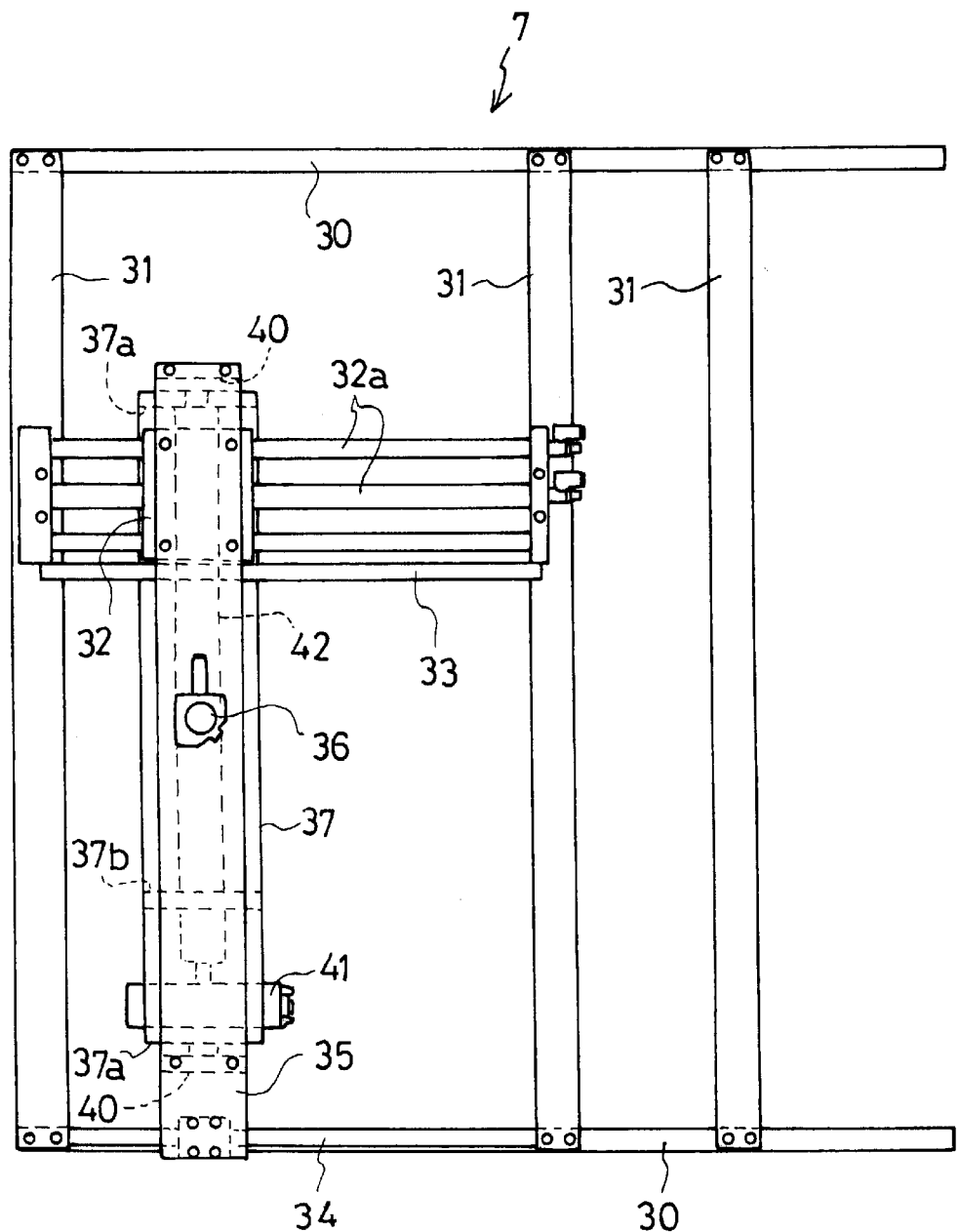
FIG. 7 is a plan view of the same.
Figure 8:
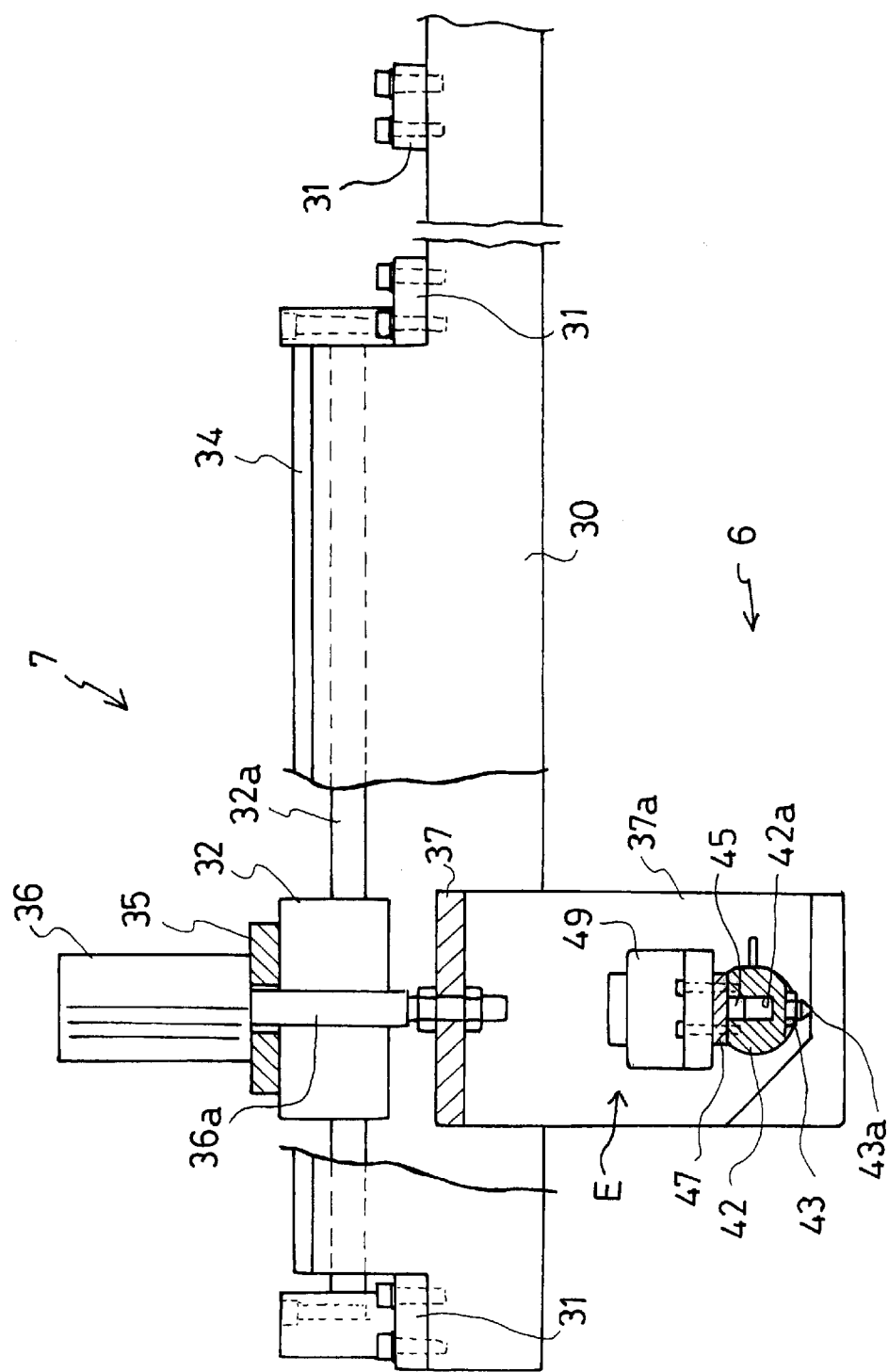
FIG. 8 is a sectional front view of the same.

Absorbing head 6 and carrying device 7 are disposed above the left side of frame 1. Carrying device 7 is so constructed that front and rear side plates 30 are fixed onto the above portion of frame 1, and support plates 31 are spread between both side plates 30. Between the intermediate portions of two right (left in FIG. 7) support plates 31 are spread slide rails 32a of a rodless cylinder 32 and support rails 33. A rail 34 is fixed onto rear side plate 30. One end (a rear end) of a slide plate 35 is slidably guided and mounted on rail 34 and the other end thereof is fixed onto rodless cylinder 32. Rodless cylinder 32 is fed with pressure air so as to be driven laterally.

Absorbing head 6 is attached to slide plate 35. Slide plate 35 is provided at the above portion of the approximately longitudinal center thereof with a lifting cylinder 36 vertically. Onto the lower end of a piston rod 36a of lifting cylinder 36 is fixed an above portion of a lifting frame 37. Lifting frame 37 is formed arcuate. A pair of sliders 39 are disposed at the outsides of both side plates 37a of lifting frame 37. Sliders 39 are guided by a pair of guide plates 40 hung from the both sides of slide plate 35, when they slide up and down.

A rotary actuator 41 is provided at the lower portion of the inner side of one side plate 37a. A middle plate 37b is eccentrically disposed toward rotary actuator 41 and in parallel therewith between side plates 37a. A nozzle body 42 is rotatably supported at the lower portion between the other side plate 37a and middle plate 37b. One end of nozzle body 42 is connected with a driving shaft 41a of rotary actuator 41. Nozzle body 42 is so constructed as to be a pipe and at the lower portion thereof are disposed a plurality of end nozzles 43 at regular intervals. In this embodiment, eight end nozzles 43 are provided. End nozzles 43 of nozzle body 42 in communication with a vacuum augmentor (not shown) can suck and absorb seed S on absorptive mouths 43a thereof.

Figure 9:
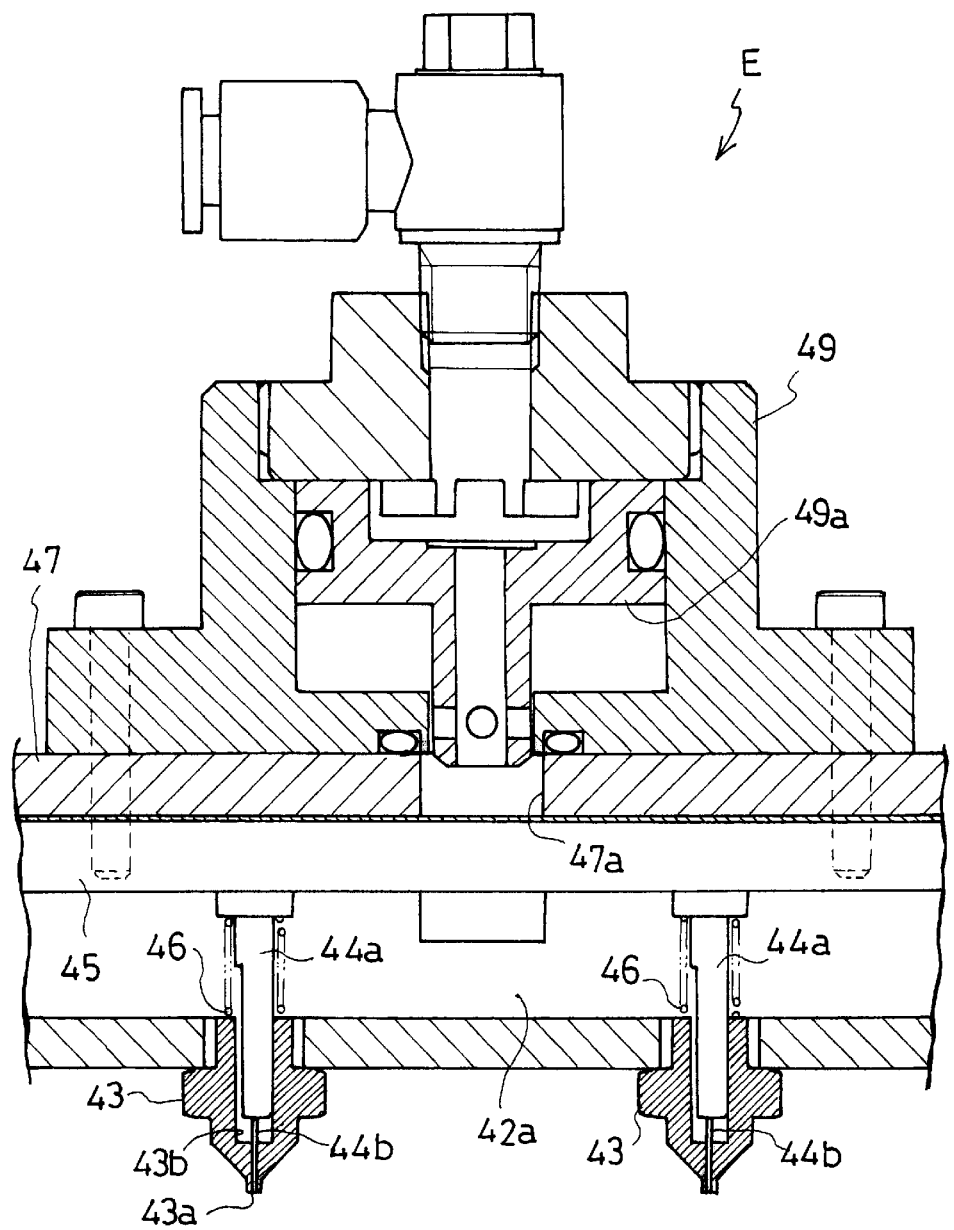
FIG. 9 is an enlarged sectional side view of the absorption head.

Thrust pins 44 are exsertably inserted respectively into absorptive mouths 43a of end nozzles 43. A reciprocative driving portion E is provided at the upper center portion of nozzle body 42, so that thrust pins 44 project outwardly when seed S are going to be discharged. To be detailed, as shown in FIG. 9, a vacant portion of pipe-shaped nozzle body 42 is so constructed as an air passage 42a which contains therein a pressure plate 45. Thrust pins 44 are hung from pressure plate 45 so as to be positioned respectively in correspondence with end nozzles 43. Each thrust pin 44 comprises a large diametric portion 44a and a small diametric portion 44b. Small diametric portion 44b, which projects from the end of large diametric portion 44a, has a diameter correspondent with that of a discharging hole 50a of a discharge nozzle 50 to be discussed below. Discharge nozzle 50 and thrust pin 44 can be changed in correspondence with the size of (minute) seed S. A spring 46 is bound around the external surface of large portion 44a. It biases pressure plate 45 upwardly, so as to insert small portion 33b into end nozzle 43. The lower portion of large diametric portion 44a of thrust pin 44 being reciprocated is guided by air passage 43b of end nozzle 43.

Nozzle body 42 contains in air passage 42a thereof pressure plate 45 and shut with a encapsulate 47 through a packing. An actuator 49 made of a cylinder is fixed onto the longitudinal center of encapsulate 47. A piston 49a of actuator 49 is inserted into an inserting hole 47a opening at the center of encapsulate 47. Piston 49a projects from inserting hole 47a so as to push pressure plate 45 by extension of actuator 49.

According to such a construction, when slide plate 35 slides leftwardly (rightwardly in FIG. 7) by driving of rodless cylinder 32, absorption head 6 is positioned above stocker 6. Then, lifting cylinder 36 extends, so that end nozzles 43 take positions correspondent with recess 27a of vibratory plate 27. Vibrator 26 is driven so as to suspend seed S, and the vacuum augmentor is operated so that rotary actuator 41 is driven so as to swing end nozzles 43. Thus, swinging end nozzles 43 suck and absorb seed S on absorptive mouth 43a thereof. A pressure sensor connected with a control circuit detects such absorption of each seed S, so as to judge whether all absorptive mouths 43a absorb seed S or not. If there is no seed S on recess 27a of vibratory plate 27, drawing device 4 is driven so as to feed seed S from hoppers 3.

When seed S are absorbed onto absorptive mouths 43a, rotary actuator 41 is stopped. End nozzles 43 are lifted up by contraction of lifting cylinder 36, slide rightwardly by driving of rodless cylinder 32, and are positioned respectively on discharge nozzles 50 of processing portion B to be discussed below by the second extension of lifting cylinder 36. Then, end nozzles 43 stop sucking so that seed S fall respectively on the tops of discharge nozzles 50. Actuator 49 extends so as to push pressure plate 45 down, thereby thrust pins 44 project outwardly from absorptive mouths 43a of end nozzles 43 so as to thrust seed S respectively into discharge nozzles 50. Then, actuator 49 is contracted and pressure plate 45 is lifted up by bias of spring 46 so as to lift up pressure plate 45, and thrust pins 44 are returned into absorptive mouths 43a of end nozzles 43.

Figure 10:
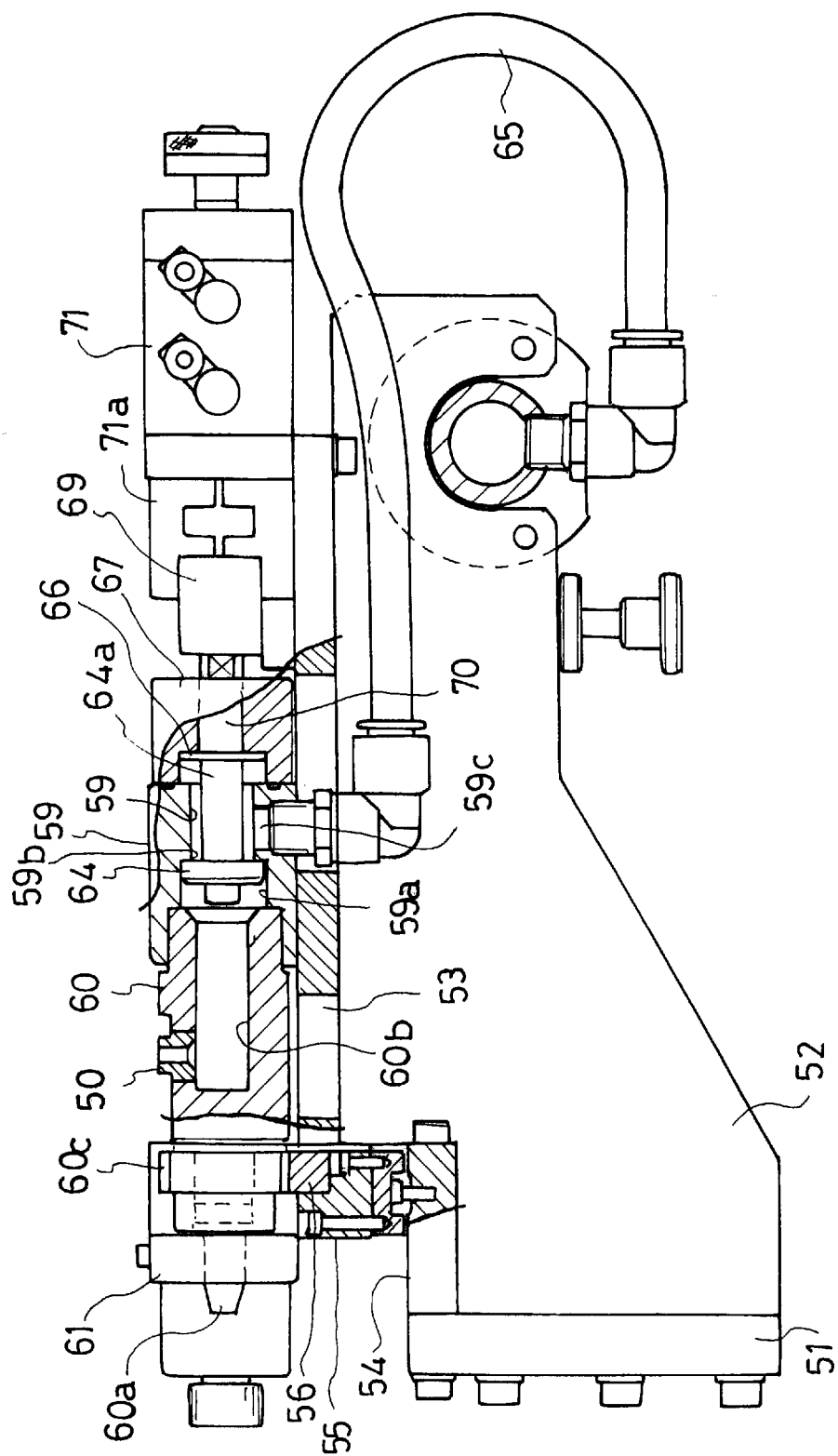
FIG. 10 is a partly sectional front view of the processing port ion.
Figure 11:
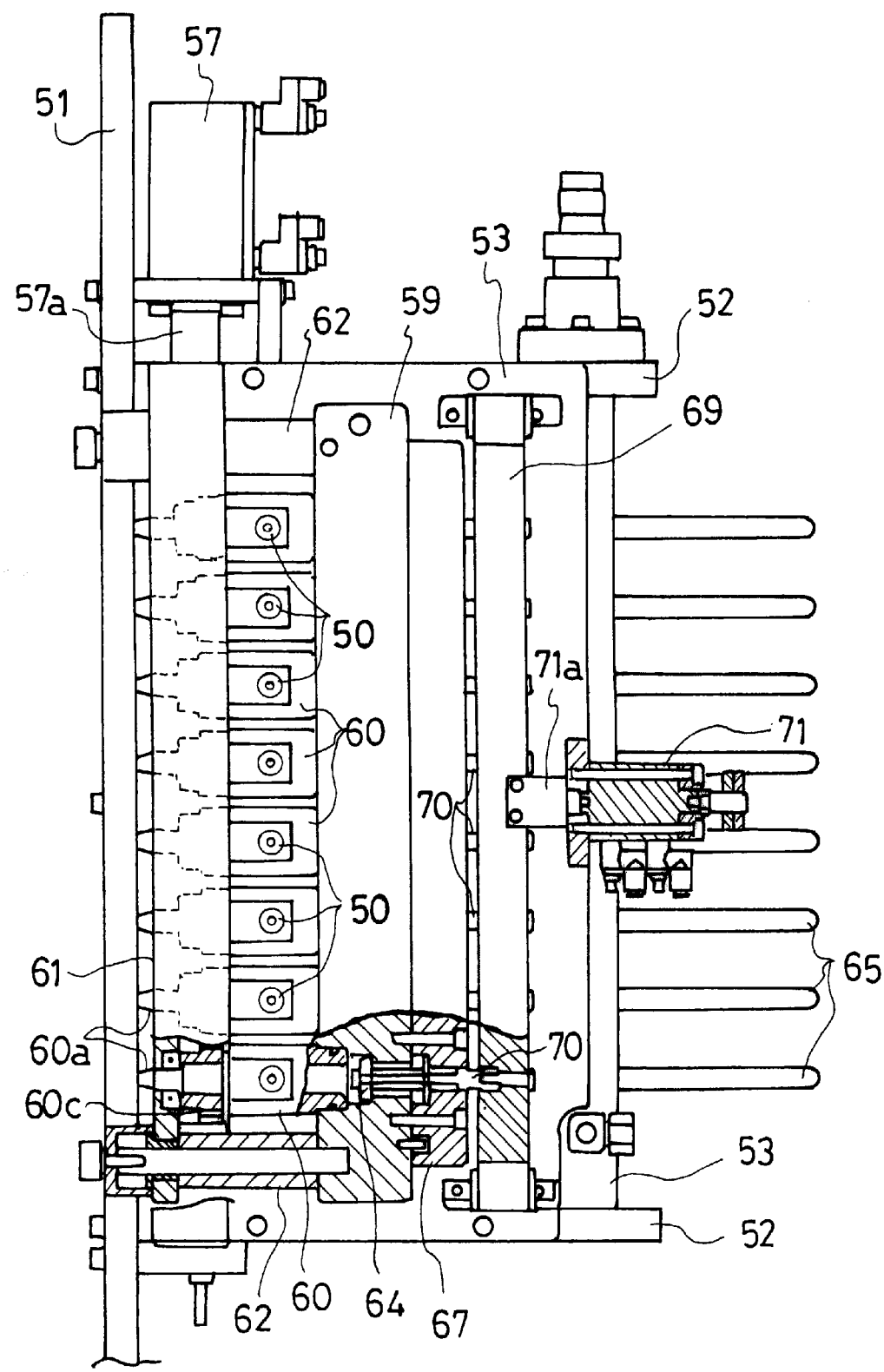
FIG. 11 is a partly sectional plan view of the same.
Figure 12:
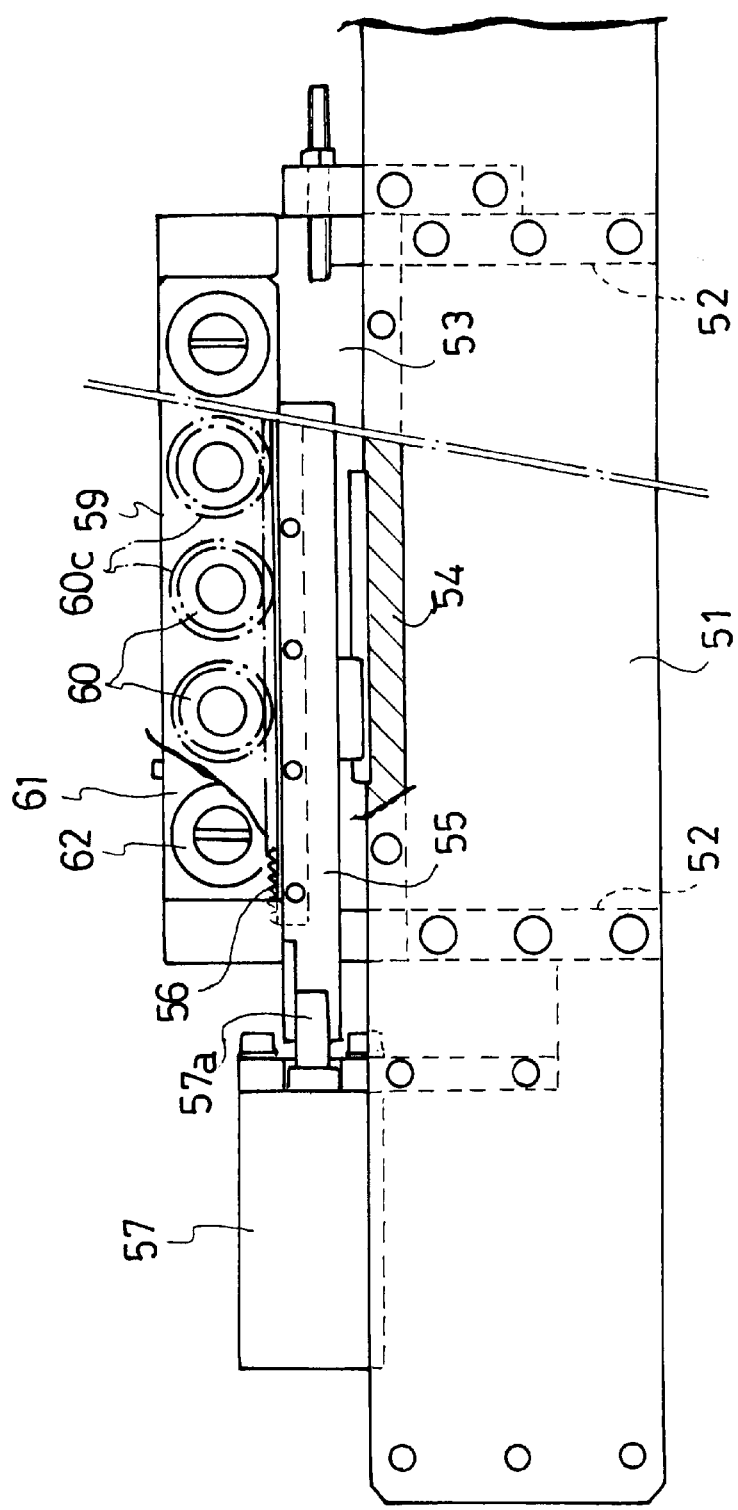
FIG. 12 is a side view of the same.

As shown in FIGS. 10, 11 and 12, processing portion B is so constructed that an attachment plate 51 disposed longitudinally is fixed onto frame 1, a pair of side plates 52 project rearwardly from front and rear portions of attachment plate 51, a base plate 53 is spread on both side plates 52. A slide plate 54 is spread on both front portions of side plates 52, a rack holder 55 longitudinally slidably engages with slide plate 54 and a rack is fixed onto rack holder 55. One end (rear end in this embodiment) of rack holder 55 is fixedly connected with a piston rod 57a of an actuator 57 made of a cylinder. Actuator 57 is fixed to attachment plate 51 and slide plate 54.

A valve case 59 is fixed longitudinally on the center of base plate 53. Rotary nozzles 60 of the same quantity (eight in this embodiment) with end nozzles 43 are disposed on the left surface of valve case 59 respectively in correspondence with the positions of end nozzles 43. Rotary nozzles 60 form at the front ends thereof shaft portions 60a respectively. Shaft portions 60a are rotatably supported by a bearing holder 61 through bearings. The front and rear ends of bearing holder 61 are fixed onto valve case 59 trough a pair of support shafts 62, so as to prevent rotary nozzles 60 from falling out.

Discharge nozzles 50 are fixed respectively on the circumference of the lateral center of rotary nozzles 60. A gel passage 60b is bored in each rotary nozzle 60 along the axis thereof from the right end thereof, so as to communicate with discharge nozzle 50. A pinion portion 60c is formed at the circumference of the left portion of each rotary nozzle 60, so as to always engage with rack 56. Rack 56 longitudinally slides by extension and contraction of actuator 57, so as to rotate rotary nozzles 60.

Valve case 59 is pierced laterally by through holes 59a which communicate respectively by gel passages 60b, and valves 64 are inserted respectively into through holes 59a. Each valve 64 fits a valve seat 59b formed in each through hole 59a. At the left side each valve 64 is formed a discharging port, and at the right side thereof is formed a cylinder chamber in communication by gel support port 59c, which is connected with a hose pipe 65 so as to support gelling.

Diaphragms 66 are fixed respectively on shaft portions 64a of valves 64 and contained in a plunger case 67. The ends of shaft portions 64a are connected respectively with plungers 70 project from a connection plate 69 fixedly connected with a piston rod 71a of an actuator 71 made of such a cylinder as an air cylinder, an electric cylinder, a solenoid or the like.

Figure 13:
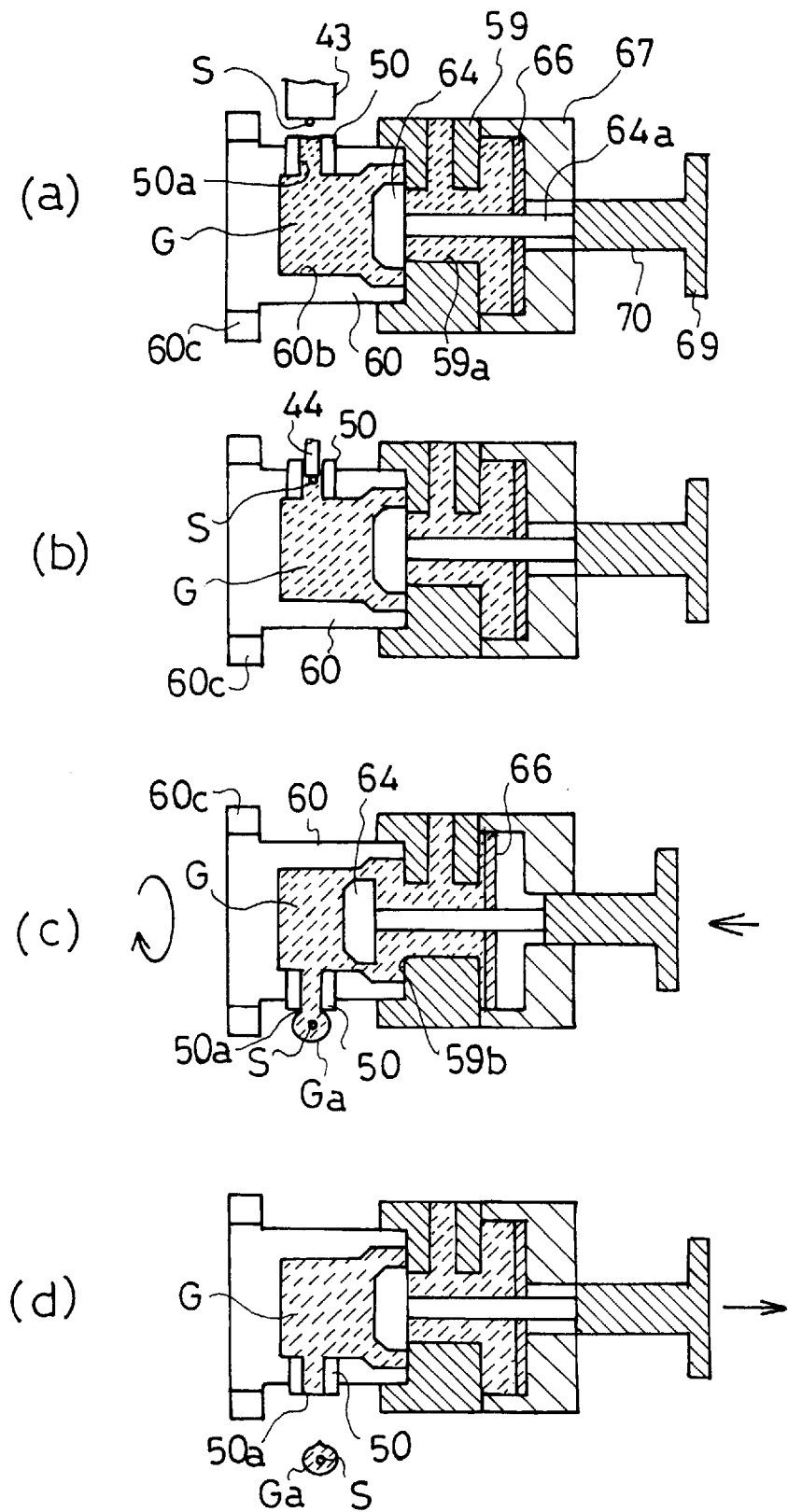
FIG. 13(a)–(d) are sectional views of the encapsulating process of the gel encapsulating apparatus.

According to such a construction, a seed S is encapsulated by gelling G in one of rotary nozzles 60 of processing portion B as shown in FIG. 13. Gelling G is filled in the whole of gel passage 60b and through hole 59a of valve case 59. Then, actuator 57 is extended (or contracted), so that rack 56 slides and pinion portion 60c of rotary nozzle 60 engaging wit rack 56 is rotated. Thus, discharge nozzle 50 makes a half turn so as to be directed upwardly as shown in FIG. 13(a)

End nozzle 43 absorbing seed S from seed supply portion A is disposed above discharge nozzle 50. Seed S is dropped on the membrane of gelling G in discharging hole 50a of discharge nozzle 50, and is thrust into gelling G by projection of thrust pin 44 as shown in FIG. 13 (b). Thrust pin 44 is drawn out and actuator 57 is contracted (or extended), so that rack 56 slides backward and rotary nozzle 60 makes more half turn so as to return to the original position directed downwardly.

Then, by extension of actuator 71, diaphragm 66 moves simultaneously so as to push gelling G in the cylinder chamber, and valve 64 is separated from valve seat 59b so as to be open, thereby a gelling Ga including seed S and an air bubble is pushed out from discharging hole 50a of discharge nozzle 50. When diaphragm 66 completes pushing gelling G, actuator 71 is contracted, valve 64 shuts, and diaphragm 66 is drawn back sucking gelling G, so that, as shown in FIG. 13(d), gelling Ga, which has been pushed out, comes to be an encapsulated seed in gel of a settled largeness by empty weight against gelling G drawn back, and falls as a drop into hardening portion C, so as to be processed by the above mentioned manner. Such an operation is repeated so as to process encapsulating continuously by each rotary nozzle 60, and furthermore, a plurality of rotary nozzles 60 are simultaneously operated, thereby enabling encapsulated seed in gel to be mass-produced.

The present invention so constructed as the above brings the following effects:

In an apparatus for encapsulating seed by gel, by use of which seed are drawn out from a hopper of a seed supply portion into a stocker, are absorbed by an absorption head and are carried by move of the absorption head, since the stocker comprises a vibratory plate and a vibrator, the vibratory plate forms at one side thereof a recess and communicates at the other side thereof with the vibrator, and seed are stored on the recess, so as to be suspended by vibration of the vibrator, the seed can be properly scattered on the recess without lumping or omnipresence generating any empty space, so that the absorption head can absorb the seed steadily.

Also, in an apparatus for encapsulating seed by gel, by use of which seed are absorbed by an absorption head and are fed into discharge nozzles for discharging gelling, so as to encapsulate the seed with the gelling, since thrust pins are exsertably inserted respectively into end nozzles of the absorption head and are connected with an actuator, so that the thrust pins project outwardly at the period of casting the seed into the discharge nozzles, the thrust pins are reciprocated so as to sweep the end nozzles for absorbing seed, thereby preventing the end nozzles from being choked up, and enabling them to absorb seed steadily, and the thrust pins project so as to push seed when the seed are going to be fed into the discharge nozzles, thereby discharging the seed from the end nozzles steadily.

Also, in the above construction, since when the seed are going to be cast, the end nozzles of the absorption head and the discharge nozzles for discharging gelling are disposed so as to face each other, and after the seed fall on the gelling, the thrust pins project outwardly so as to thrust the seed into the gelling in the discharge nozzles, even if the seed are minute, they are made entering the gelling compulsorily and steadily, avoiding such a mistake of encapsulating that seed stick to the eternal surface of gelling, thereby improving in the rate of encapsulating seed by gel.

Also, in an apparatus for encapsulating seed by gel, by use of which seed are absorbed by a plurality of end nozzles of an absorption head and are fed into a plurality of discharge nozzles for discharging gelling, so as to encapsulate the seed with the gelling, since the discharge nozzles are provided respectively on rotary nozzles, which are rotatable around the axes thereof and are disposed in parallel with each other, pinion portions are formed respectively at one sides of the rotary nozzles and engage with a rack in connection with an actuator, the rotary nozzles can be rotated simultaneously by operation of only the single actuator, thereby simplifying the mechanism for driving the rotary nozzles and reducing the cost thereof. And since the rack is connected with the actuator, so that each discharge nozzle can be turned up and down by operation of the actuator, the rotary nozzles can receive the seed when they are turned upward, preventing the seed from falling causing a mistake of encapsulating at the period of positioning the seed on the discharge nozzles, and can drop the gelling by empty weight when they are turned downward after reception of the seed.

Also, in an apparatus for encapsulating seed by gel, by use of which seed are absorbed by a plurality of end nozzles of an absorption head and are fed into a plurality of discharge nozzles for discharging gelling, so as to encapsulate the seed with the gelling, since gel passages of the discharge nozzles communicate respectively with plungers contained in a plunger case, and the plungers are connected with a connection plate in connection with an actuator, the gellings can be pushed out from the a plurality of discharge nozzles simultaneously by operation of only the single actuator, thereby enabling the driving mechanism for discharging gelling to be constructed as one unit and at low cost.

What is claimed is:

1. An apparatus for encapsulating plant seeds with gel, comprising:

a seed separation device for separating plant seeds from each other, wherein said seed separation device comprises a vibratory plate having a depression for accommodating plant seeds thereon, and a vibrator for vibrating the vibratory plate to suspend plant seeds on the depression;

a plurality of encapsulating nozzles each accommodating gel therein to encapsulate each seed with the gel; and a transfer device for transferring each seed from the seed separation device to the respective encapsulating nozzles.

2. An apparatus according to claim 1, further comprising a hardening device for receiving encapsulated seeds discharged from the encapsulating nozzles and for hardening the gel encapsulated seeds.

3. An apparatus according to claim 2, further comprising a washing device for washing the hardened encapsulated seeds.

4. An apparatus for encapsulating plant seeds with gel, comprising:

a seed separation device for separating plant seeds from each other;

a plurality of encapsulating nozzles each accommodating gel therein to encapsulate each seed with the gel; and a transfer device for transferring each seed from the seed separation device to the respective encapsulating nozzles, wherein said transfer device comprises a plurality of end nozzles for picking up seeds from the seed separation device and transferring the seeds to the respective encapsulating nozzles, and thrust pins projectable outwardly from the respective end nozzles to release the seeds from the end nozzles to the encapsulating nozzles.

5. An apparatus according to claim 4, wherein each encapsulating nozzle is rotatable on its axis and has an opening for receiving and discharging each seed, said opening rotating to receive each seed when at an upper position and to discharge the seed when at a lower position.

6. An apparatus according to claim 5, wherein each encapsulating nozzle comprises a pinion portion and is in combination with a rack engaging with the pinion portion, said rack being slidable to turn each encapsulating nozzle upward and downward.

7. An apparatus according to claim 5, wherein each encapsulating nozzle comprises a plunger for feeding gel into the encapsulating nozzle and for discharging the encapsulated seed from the encapsulating nozzle through the opening by exerting pressure onto the gel accommodated in the encapsulating nozzle.

8. An apparatus according to claim 4, further comprising a hardening device for receiving encapsulated seeds discharged from the encapsulating nozzles and for hardening the gel encapsulated seeds.

9. An apparatus according to claim 8, further comprising a washing device for washing the hardened encapsulated seeds.

10. A method for encapsulating plant seeds with gel, comprising the steps of:

separating plant seeds from each other, wherein plant seeds are suspended by vibration on a vibratory plate having a depression;

transferring each seed to an encapsulating nozzle accommodating gel therein; and encapsulating each seed with the gel by using the encapsulating nozzle.

11. A method according to claim 10, further comprising receiving encapsulated plant seeds discharged from the encapsulating nozzles and hardening the gel encapsulating the seeds.

12. A method according to claim 11, further comprising washing the hardened encapsulated seeds.

13. A method for encapsulating plant seeds with gel, comprising the steps of:

separating plant seeds from each other;

transferring each seed to an encapsulating nozzle accommodating gel therein, wherein the separated plant seeds are picked up by a plurality of end nozzles, transferred to the respective encapsulating nozzles, and released from the end nozzles to the encapsulating nozzles by using thrust pins projectable outwardly from the respective end nozzles; and encapsulating each seed with the gel by using the encapsulating nozzle.

14. A method according to claim 13, wherein each encapsulating nozzle rotates on its axis to receive each seed when at an upper position and to discharge the seed when at a lower position.

15. A method according to claim 14, wherein each encapsulating nozzle comprises a pinion portion and is in combination with a rack engaging with the pinion portion, and said rack slides to turn each encapsulating nozzle upward and downward.

16. A method according to claim 15, wherein each encapsulating nozzle comprises a plunger that feeds gel into the encapsulating nozzle and that discharges the encapsulated seed from the encapsulating nozzle by exerting pressure onto the gel accommodated in the encapsulating nozzle.

17. A method according to claim 13, further comprising receiving encapsulated plant seeds discharged from the encapsulating nozzles and hardening the gel encapsulating the seeds.

18. A method according to claim 17, further comprising washing the hardened encapsulated seeds.

* * * * *